Nov. 15, 1927.
G. LUBRANO
TEA MAKING SPOON
Filed Oct. 19, 1926
1,648,906
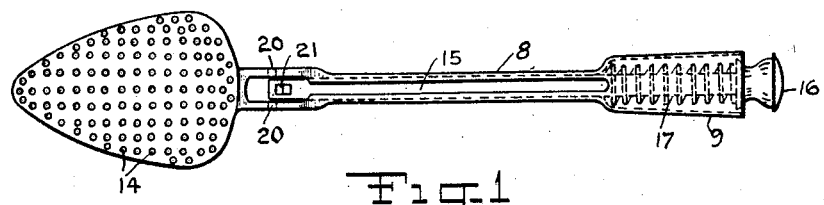
Fig. 1
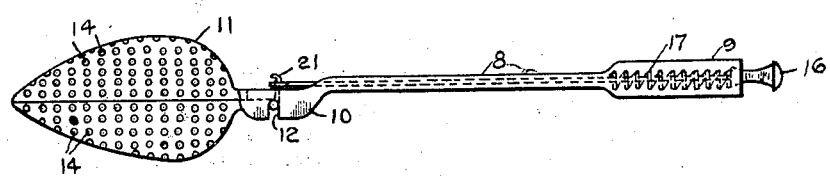
Fig. 2
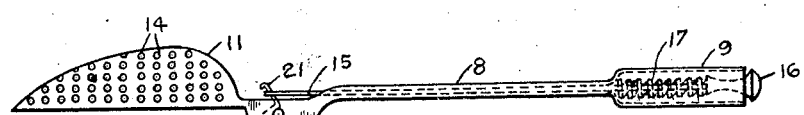
Fig. 3
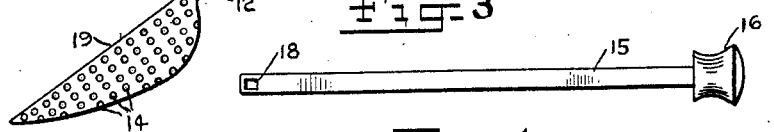
Fig. 4
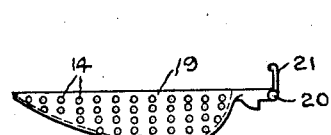
Fig. 5
Fig. 6
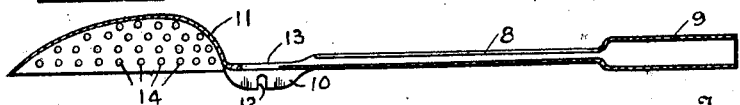
Fig. 7
Giuseppe Lubrano Inventor
By Attorney Patented Nov. 15, 1927.

1,648,906

UNITED STATES PATENT OFFICE.

GIUSEPPE LUBRANO, OF NEW YORK, N. Y.

TEA-MAKING SPOON.

Application filed October 19, 1926. Serial No. 142,623.

My invention relates to an improvement in a tea making spoon and the novelty resides in the adaptation and arrangement of parts as will be more fully hereinafter pointed out.

There are several tea or beverage making spoons some of which have been patented but none of which have been a success on the market for the reason that they are not easily operated and easily separated for the purposes of cleaning and none of them are sanitary as they require the operator to handle the container portion in order to operate the same.

My device has solved all of these difficulties and furnishes a spoon which can be easily and readily operated at the handle end so that the operator does not need to touch the container end and the spoon can be quickly and easily separated so as to be thoroughly cleansed and washed with the minimum of trouble.

Referring to the drawings Figure 1 is a top plan view of my device showing a portion in dotted outline. Figure 2 is a side view of the same. Figure 3 is the same as Figure 2 but with the pivoted half of the bowl shown in the opened out position. Figure 4 is a top plan view of the plunger member. Figure 5 is a top plan view of the spring. Figure 6 is a side view of the pivoted half of the bowl as separated. Figure 7 is a vertical section along the central line of the handle and half bowl attached thereto.

In the drawings 8 is a handle member having an enlarged portion 9 at its upper end, a pair of shoulder members 10 at its lower end and terminating in a foraminous half bowl 11. Said shoulder members 10 have slots 12 therein and the handle portion 8 has an opening 13 midway between the two shoulder members 10 and said foraminous half bowl 11 has openings 14 therein. A plunger member 15 having a handle portion 16 at its outer end is adapted to be mounted in said handle 8 through a spring 17 which is mounted in the enlarged portion 9 of said handle 8 and the inner end of said plunger 15 has an opening 18 substantially in alignment with the opening 13 in the handle 8. A second foraminous half bowl member 19 having at its inner end a pivot bar 20 and midway of said bar 20 a vertically projecting pin 21 downturned at its upper end is adapted to be mounted contiguous to said half bowl 11 passing the pin 21 through openings 13 and 18 and registering the pivot bar 20 in the slots 12, it being necessary to press the handle 16 of the plunger member 15 against the pressure of the spring 17 in order to align the opening 18 with the opening 13 to do this.

The spoon being first cleaned is assembled as shown in Figures 1, 2 and 3 and can then be used by the operator holding the upper end of the handle 8 at the enlarged portion 9 so that the thumb can be pressed against the projecting handle 16 of the plunger 15 whereby the plunger 15, being pressed downwardly against the spring 17 will push against the pin 21 passing therethrough, thereby tilting the same and the half bowl 19 pivoted on the pivot bar 20 in the slots 12 of the shoulders 10 will tilt to the position shown in Figure 3 thereby opening so as to permit the operator to plunge said open bowl members 11 and 19 into the container holding tea, coffee or other beverage, and the operator releasing the thumb pressure on 16, thereby permitting the bowl member 19 to close upon the bowl member 11 so that said foraminous bowl members 11 and 19 will contain the desired quantity of tea or coffee or other beverage. The operator still holding the handle enlarged portion 9 as described will then place the foraminous half bowl members 11 and 19 in the closed position as shown in Figure 2 in a cup, pouring boiling water thereon or stirring the spoon in a cup of boiling water or other suitable container whereby the tea, coffee or other desired beverage can be made in the usual manner. Having exhausted the tea, coffee or other beverage contained in said foraminous bowl members 19 and 11 the operator will again press on the projecting handle portion 16 of the plunger 15 again opening the half bowl 19 permitting the removal of the exhausted tea leaves or coffee, etc. rinsing out the same in the usual manner whereupon the spoon will again be ready for refilling and used as described.

The pivoted half bowl 19 may be detached from the spoon by the operator passing the projecting handle 16 to a position such that the opening 18 is in alignment with the opening 13 but not pushing far enough so as to press against the pin 21 whereupon the operator, taking hold of the half bowl 19 may slip the downturned pin 21 down through said openings 18 and 13 and the pivot bar 20 out of the slots 12 and the plunger member 15 may then be withdrawn entirely from the handle 8 whereby all of the separated parts as described may be readily and thoroughly cleaned before putting the same together again.

Many variations may be made in the structure without departing from the spirit and intent of my invention.

I claim—

1. In a tea making spoon the combination of a handle having one half of a foraminous bowl and a pair of adjacent slotted shoulders at one end and an enlarged portion at the other end holding a spring, a plunger member mounted in said handle and held in its extended position by said spring, openings adapted to be put in alignment in said handle and plunger at said shoulders and a second half bowl member having a pivot bar pivoting in said shoulder slots and a hook member passing through said openings.

2. In a tea making spoon the combination of a handle terminating in a pair of slotted shoulders and a foraminous half bowl, a second foraminous half bowl pivoted on said shoulders contiguous to said first half bowl and completing a bowl and means for operating said pivoted half bowl at the opposite end of said handle.

3. In a tea making spoon the combination of a handle terminating in a pair of slotted shoulders and a foraminous half bowl, a second foraminous half bowl pivoted on said shoulders contiguous to said first half bowl and completing a bowl and means for operating said pivoted half bowl at the opposite end of said handle comprising an enlarged portion containing a spring, a plunger passing through said spring and handle, openings in alignment in said plunger and handle at the bowl end and a tilting and retaining arm extending up from the pivot end of said second half bowl through said openings.

In testimony whereof I affix my signature.

GIUSEPPE LUBRANO.